I. CERPIAL.
VEGETABLE BOILER.
APPLICATION FILED APR. 13, 1917.

1,271,530.

Patented July 2, 1918.

Inventor
Ignacy Cerpial
By his Attorney
Oscar Gein

UNITED STATES PATENT OFFICE.

IGNACY CERPIAL, OF SOUTH BEND, INDIANA.

VEGETABLE-BOILER.

1,271,530.  Specification of Letters Patent.  Patented July 2, 1918.

Application filed April 13, 1917. Serial No. 161,710.

*To all whom it may concern:*

Be it known that I, IGNACY CERPIAL, a subject of the Czar of Russia, resident of South Bend, county of St. Joseph, and State of Indiana, have invented certain new and useful Improvements in Vegetable-Boilers, of which the following is a specification.

This invention relates to improvements in culinary utensils, and particularly to boilers such as are adapted for cooking vegetables.

The principal object of the invention is to provide a boiler with readily removable or engageable handles in order that they may be used in a relatively cool condition.

This is attained by the novel construction and combination of parts hereafter described and shown in the accompanying drawings, forming a material part of this specification, and in which:—

Figure 1:
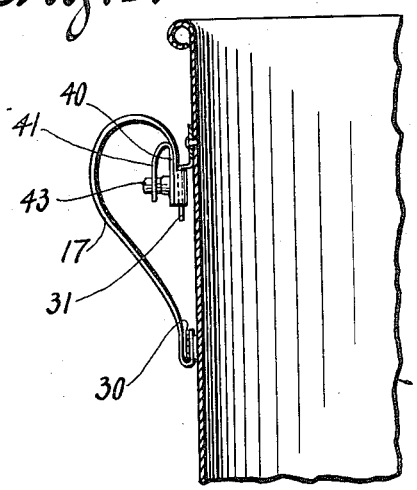
Figure 1 is a sectional view of the vessel showing the handle and attaching means therefor.

Referring to the present drawings and more particularly to the details of the removable handle and its attaching means, it will be seen that the same consists of a loop 30 rigidly attached to the wall 10 of the vessel, while in register with the same and immediately above it is an out-turned prong element 31 in which is formed an opening 32, the prong being secured to the wall 10 by means of the riveted flange 33.

The lower end of the handle 17 is bent upward, the upturned member 35 inclosing a space 36 adapted to engage with the loop 30 when drawn into engagement with it, while formed with the downturned, upper end of the handle 17 are a pair of oppositely disposed ears 37, containing, between their inturned walls and the main body of the downturned handles, openings 38 adapted to engage with the prong 31 so as to be held in place by the same.

Figure 2:
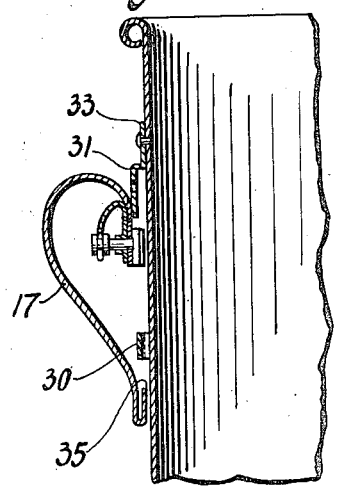
Fig. 2 is another sectional view taken through the center of the same showing the construction.
Figure 3:
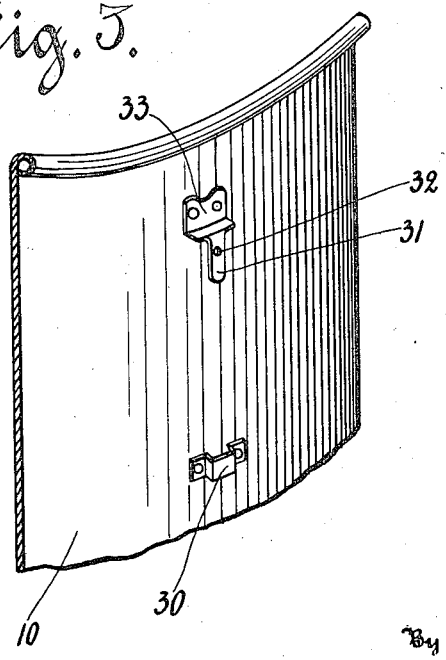
Fig. 3 is a fragmental perspective view showing the parts attached to the exterior of the vessel.
Figure 4:
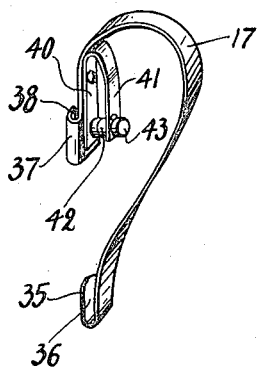
Fig. 4 is a perspective view of the handle in detail.

Secured opposite to the ears 37, is a plate 40 bent downward, the free spring leaf portion 41, having a pin 42, so engaged that it can move in or out when the knob 43 is actuated, the normal position being so that the point of the pin engages in the opening 32 of the bracket 33, thereby locking the handle in position on the side of the vessel. The method of attaching is clearly shown in Fig. 2, in which the handle 17 is in position to be moved upward, so that the turned end 35 engages with the loop 30 and at the same time the prong 31 enters the opening 38, whereupon the spring leaf 41 presses the pin toward the side of the vessel, engaging in the opening 32 and locking the handle rigidly in position.

When it is desired to remove the same, the leaf 41 and knob 43 may be grasped withdrawing the pin, whereupon the handle may be pressed downward and freed from the vessel.

From the foregoing, it will be seen that an inexpensive cooking utensil has been shown provided with removable handles which may be used when in a cool condition.

Having thus described my invention, what I claim as new and desire to secure by Letters Patent, is:—

In combination, a vessel, a loop secured to the side thereof and opening vertically, a depending out-turned prong element secured to the side of the vessel above said loop, and provided with an opening, a handle formed with an upwardly-bent hook-shaped member engaging said loop and a pair of oppositely-disposed ears formed upon the upper end of the handle at right angles to said upwardly-bent member, and engaging said depending out-turned prong element, the main wall of said handle adjacent said ears being formed with an opening, a spring leaf having a flat portion secured to said handle and formed with an opening registering with the last-named opening, and also provided with an outwardly-curved member carrying a pin, said spring holding said pin within the mentioned registering openings as well as within the prong opening, said handle being detachable by the withdrawal of said pin from the prong opening and a sliding downward movement of the handle.

In testimony whereof I have affixed my signature.

IGNACY CERPIAL.